United States Patent
Nakajima

(10) Patent No.: US 7,593,224 B2
(45) Date of Patent: Sep. 22, 2009

(54) ELECTRONIC APPARATUS HAVING A HINGE TO REVERSE A DISPLAY UNIT AGAINST MAIN BODY

(75) Inventor: Yuji Nakajima, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 197 days.

(21) Appl. No.: 11/641,347

(22) Filed: Dec. 18, 2006

(65) Prior Publication Data

US 2007/0159782 A1    Jul. 12, 2007

(30) Foreign Application Priority Data

Jan. 6, 2006    (JP) ............................... 2006-001741

(51) Int. Cl.
*H05K 5/00*    (2006.01)
*H05K 7/00*    (2006.01)

(52) U.S. Cl. ...................................... 361/683; 361/681

(58) Field of Classification Search ................ 361/681, 361/683, 679.06, 679.27, 679.28
See application file for complete search history.

(56) References Cited

U.S. PATENT DOCUMENTS

| | | | | |
|---|---|---|---|---|
| 7,234,204 B2 * | 6/2007 | Liu et al. | ....................... | 16/367 |
| 7,308,733 B2 | 12/2007 | An et al. | | |
| 2004/0012920 A1 * | 1/2004 | Tanimoto et al. | ............ | 361/683 |
| 2004/0227045 A1 | 11/2004 | An et al. | | |
| 2005/0207104 A1 * | 9/2005 | Love | ........................... | 361/683 |
| 2005/0246741 A1 * | 11/2005 | Liu et al. | ....................... | 725/50 |
| 2006/0203440 A1 * | 9/2006 | Lev et al. | ..................... | 361/683 |

FOREIGN PATENT DOCUMENTS

| | | |
|---|---|---|
| JP | 10-340134 | 12/1998 |
| JP | 11-303492 | 11/1999 |
| JP | 3082784 | 10/2001 |
| JP | 2002-158758 | 5/2002 |
| JP | 2003-316474 | 11/2003 |
| JP | 2004-53927 | 2/2004 |
| JP | 2004-118386 | 4/2004 |
| JP | 2004-145498 | 5/2004 |

(Continued)

OTHER PUBLICATIONS

Japanese Office Action dated Nov. 18, 2008 for application No. 2006-001741 (U.S. Appl. No. 11/641,347), entitled Electronic Apparatus Having a Hinge to Reverse a Display Unit Against Main Body. (English Translation).

(Continued)

*Primary Examiner*—Jayprakash N Gandhi
*Assistant Examiner*—Anthony M Haughton
(74) *Attorney, Agent, or Firm*—Blakely, Sokoloff, Taylor & Zafman LLP

(57) ABSTRACT

An electronic apparatus according to an embodiment has a main body, a display unit, and a hinge mechanism. The main body has a keyboard on the top face. The display unit contains a display device. The hinge mechanism connects the display unit to the main body, and has a rotation shaft and a swivel shaft. The rotation shaft moves rotationally the display unit between a closed state covering the keyboard and an opened state standing up against the main body. The swivel shaft is provided inclined to the top face of the main body, and turns the display unit when the display unit is in a rotatable state.

8 Claims, 8 Drawing Sheets

FOREIGN PATENT DOCUMENTS

| | | |
|---|---|---|
| JP | 2004-242036 | 8/2004 |
| JP | 2004-340383 | 12/2004 |
| JP | 1622743 | 6/2005 |

OTHER PUBLICATIONS

Japanese Office Action dated Jan. 27, 2009 for application No. 2006-001741 (U.S. Appl. No. 11/641,347), entitled Electronic Apparatus Having a Hinge to Reverse a Display Unit Against Main Body. (English Translation).

Chinese Office Action dated Mar. 6, 2009 for application No. 200610167571X (U.S. Appl. No. 11/641,347), entitled "Electronic Apparatus Having a Hinge to Reverse a Display Unit Against Main Body" (English Translation).

* cited by examiner

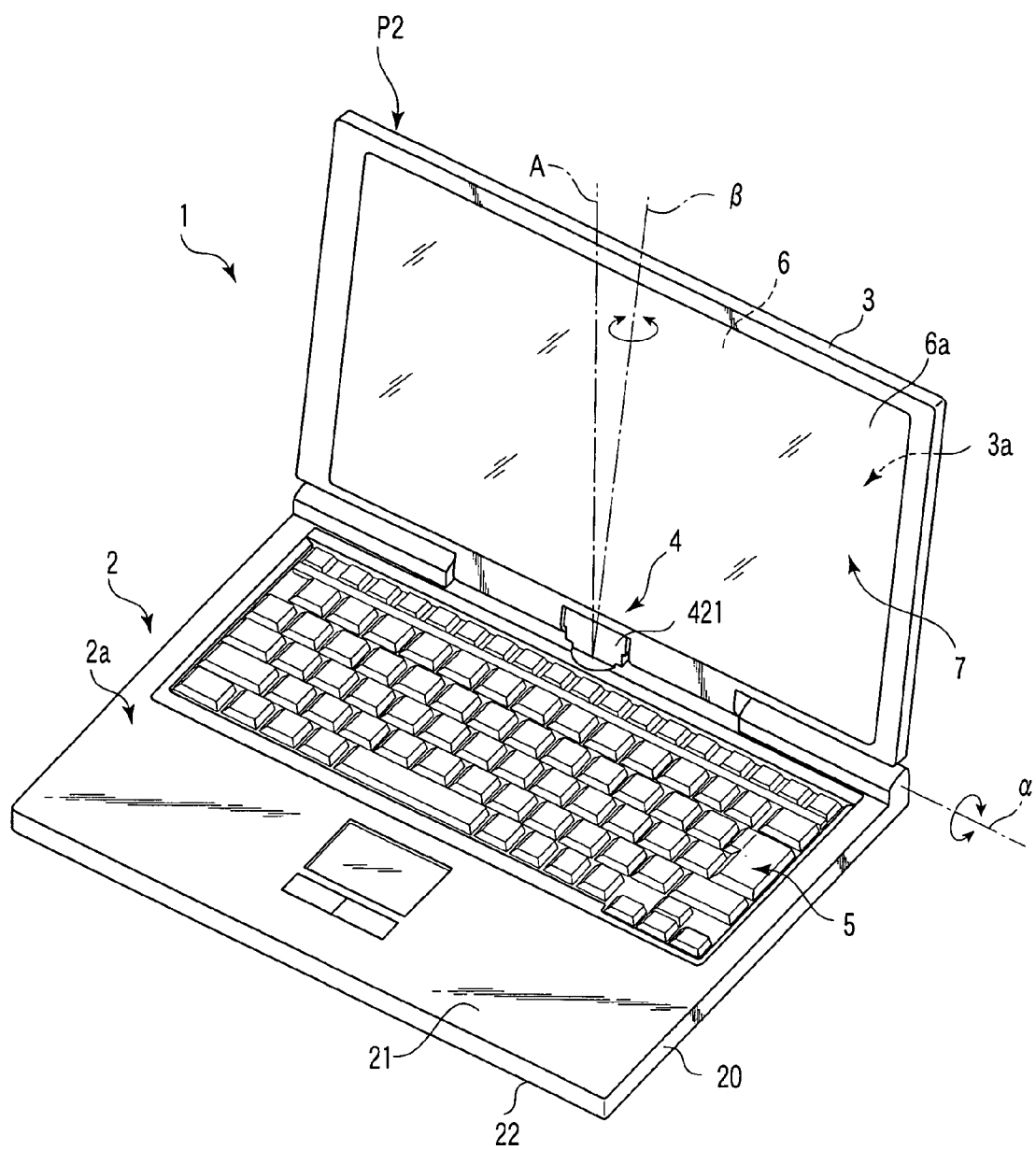
F I G. 1

ELECTRONIC APPARATUS HAVING A HINGE TO REVERSE A DISPLAY UNIT AGAINST MAIN BODY

CROSS-REFERENCE TO RELATED APPLICATIONS

This application is based upon and claims the benefit of priority from Japanese Patent Application No. 2006-001741, filed Jan. 6, 2006, the entire contents of which are incorporated herein by reference.

BACKGROUND

1. Field

An embodiment of the present invention relates to an electronic apparatus having a hinge to reverse a display unit to the states wherein a display surface is faced upward and downward against a main body.

2. Description of the Related Art

There is a notebook portable electronic apparatus whose main body and display unit are connected by a hinge. In this apparatus, a display unit can be reversed against a main body, and the display unit can be laid over a main body with a display surface faced upward. An example of such apparatus is disclosed in Jpn. Pat. Appln. KOKAI Publication No. 2004-340383.

The electronic apparatus described in this patent application has a swivel hinge assembly to connect a main body and a display unit. The swivel hinge assembly has two rotation shafts. A first rotation shaft rotates the display unit horizontally. A second rotation shaft is provided on a base rotated horizontally by the first rotation shaft. The axis of the second rotation shaft is arranged horizontally to be orthogonal to the axis of the first rotation shaft, and rotates the display unit vertically. The first rotation shaft is held in a predetermined direction to the main body. The second rotation shaft is connected to the display unit, and is rotated together with the display unit against the main body.

A portable electronic apparatus is demanded to be thin as a whole and to have a large display area. The housings of thin main body and display unit have a sufficient stiffness, but bend a little when a display unit is rotated against a main body around first and second rotation axes of a swivel hinge assembly as a hinge mechanism. When a display unit is turned around the first rotation shaft, a fixing member connected to a hinge mechanism in the main body or display unit is distorted, and the axis of the first rotation shaft may be inclined during rotation.

In order to reduce the thickness of an electronic apparatus, a second rotation shaft is desirably arranged as close to the main body as possible. In this case, if a display unit is turned around a first rotation shaft and a first rotation shaft is inclined to the front with the display surface of a display unit turned sideways for the user, the lower end of a display unit hits upon a keyboard provided on the top surface of the main body.

BRIEF DESCRIPTION OF THE SEVERAL VIEWS OF THE DRAWINGS

A general architecture that implements the various features of the invention will how be described with reference to the drawings. The drawings and the associated descriptions are provided to illustrate embodiments of the invention and not to limit the scope of the invention.

FIG. 1 is a perspective view of an example of an electronic apparatus according to a first embodiment of the invention;

DETAILED DESCRIPTION

Figure 2:
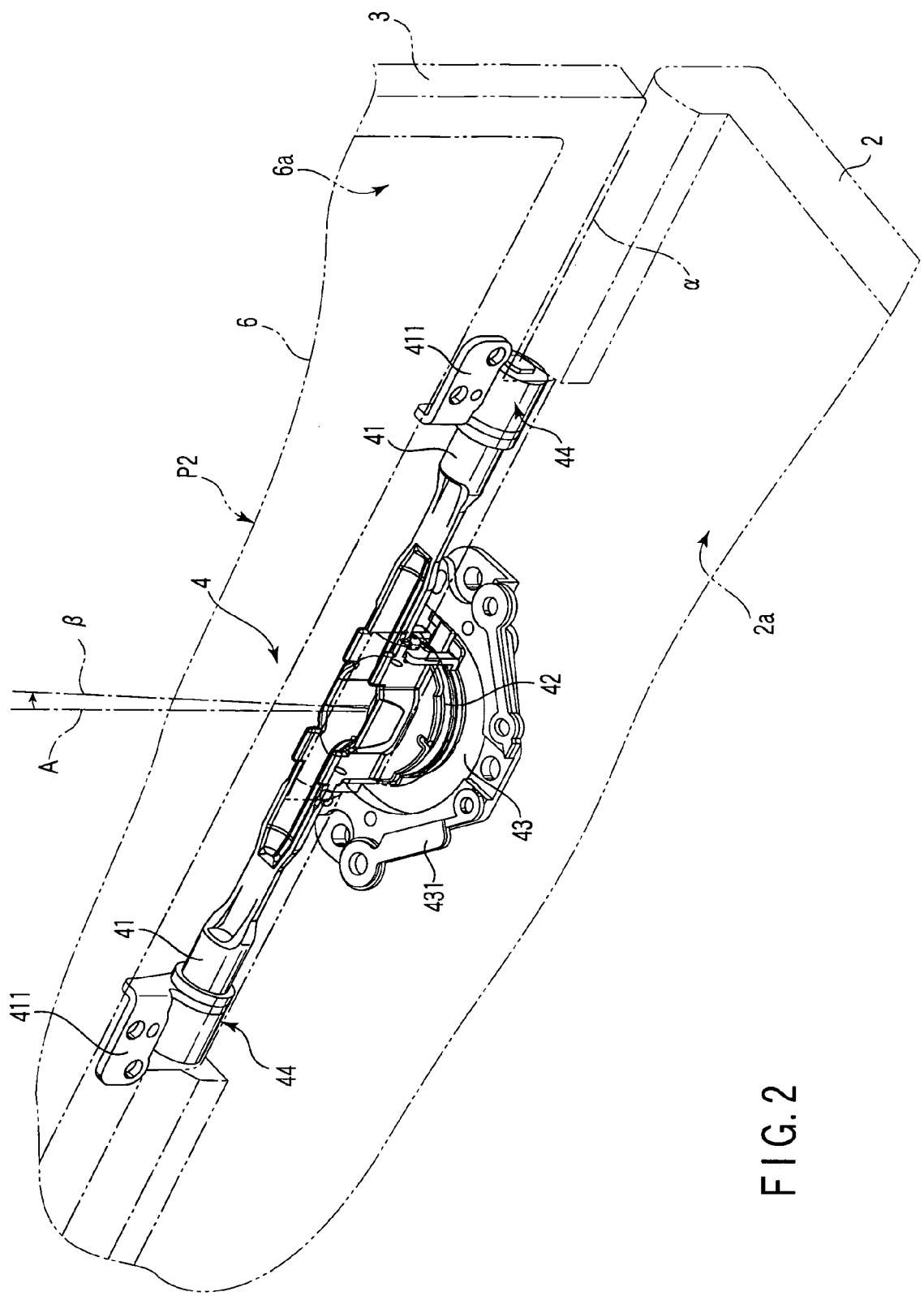
FIG. 2 is an exemplary perspective view of a hinge mechanism provided in the electronic apparatus shown in FIG. 1.

Various embodiments according to the invention will be described hereinafter with reference to the accompanying drawings. In general, according to an embodiment of the invention, an electronic apparatus has a main body, a display unit, and a hinge mechanism. The main body has a keyboard on the top surface. The display unit contains a display device. The hinge mechanism connects the display unit to the main body, and has a rotation shaft and a swivel shaft. The rotation shaft makes the display unit rotatable between a closed state covering the keyboard and an opened state standing up to the main body. The swivel shaft is provided inclined to the direction separating away from the top surface of the main body, and makes the display unit turnable when the display unit is in a rotatable state.

In this electronic apparatus, the display unit does not contact the keyboard provided on the top surface of the main body, on the way of reversing to the main body.

An example of an electronic apparatus according to a first embodiment of the invention will be explained with reference to FIG. 1 to FIG. 7. The electronic apparatus 1 shown in FIG. 1 has a main body 2, a display unit 3, and hinge mechanism 4. For convenience of explanation, the right, left, front and back sides of the main body 2 viewed from the user side are defined in the state put the main body 2 on a table, and the vertical direction is defined as upper and lower directions.

The main body 2 has a main body housing 20 forming an outer frame, and contains a circuit substrate on which a central processing unit (CPU) is mounted, and a storage medium. On the top face 2a of the main body 2, a keyboard 5 is provided as an input means. The display unit 3 has a liquid crystal display 6 and a touch panel 7.

The liquid crystal display 6 is an example of display device connected to the circuit substrate contained in the main body 2 and displays information. The liquid crystal display 6 may be an organic electroluminescence, or a surface-conduction electron-emitter display (SED). The touch panel 7 is an example of an input means to permit input operations from the display surface 6a. The touch panel is laminated on the display surface 6a of the liquid crystal display 6, and permits input operations related to the information displayed on the liquid crystal display 6.

Figure 3:
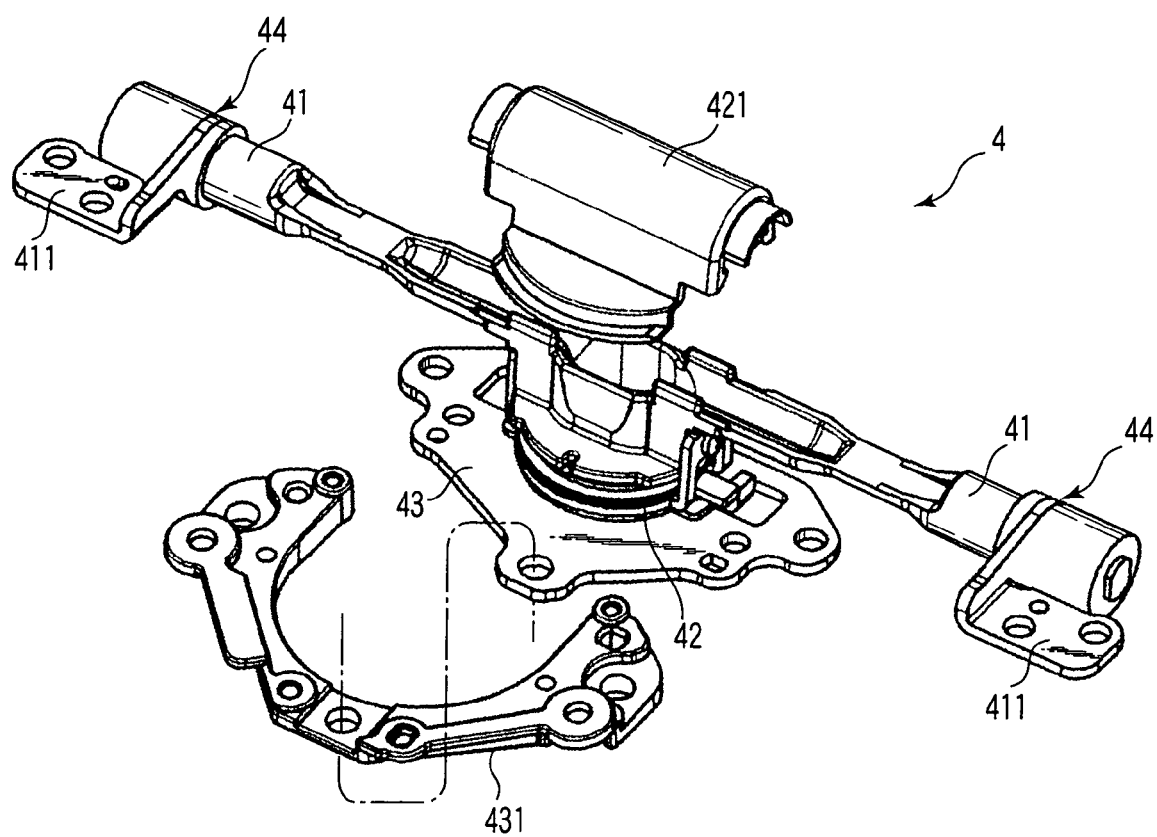
FIG. 3 is an exemplary exploded perspective view of the hinge mechanism shown in FIG. 2.

The hinge mechanism 4 has a rotation shaft 41, a swivel shaft 42, and a base plate 43, and connects the display unit 3 to the main body 2, as shown in FIG. 2. The rotation shaft 41 has a rotary arm 411 extending in the radial direction from the axis α of the rotation shaft 41, as shown in FIG. 2 and FIG. 3. The rotary arm 411 is fixed to the inside of the display unit 3.

Figure 4:
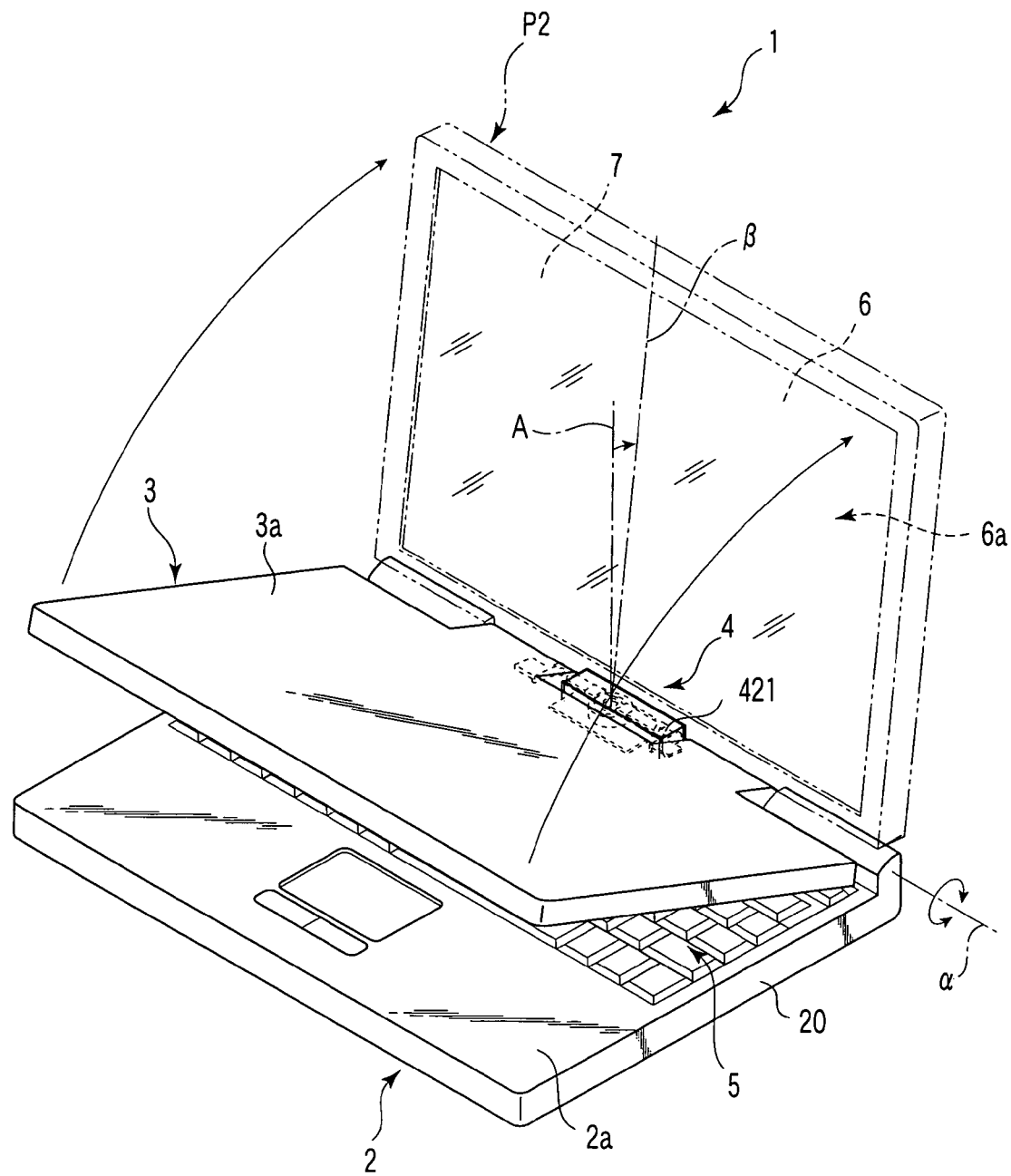
FIG. 4 is an exemplary perspective view of a state wherein a display unit of the electronic apparatus shown in FIG. 1 is turned around a rotation shaft of a hinge mechanism.

As shown in FIG. 4, the rotation shaft 41 is provided to rotationally move the display unit 3 around the axis α from a closed state laid over the main body 2 covering the keyboard to an opened state P2 standing up to the main body 2. The axis α of the rotation shaft 41 is arranged along one side of the display unit 3 close to the rear part of the main body 2, in the state wherein the display unit 3 is laid over the main body 2.

Figure 5:
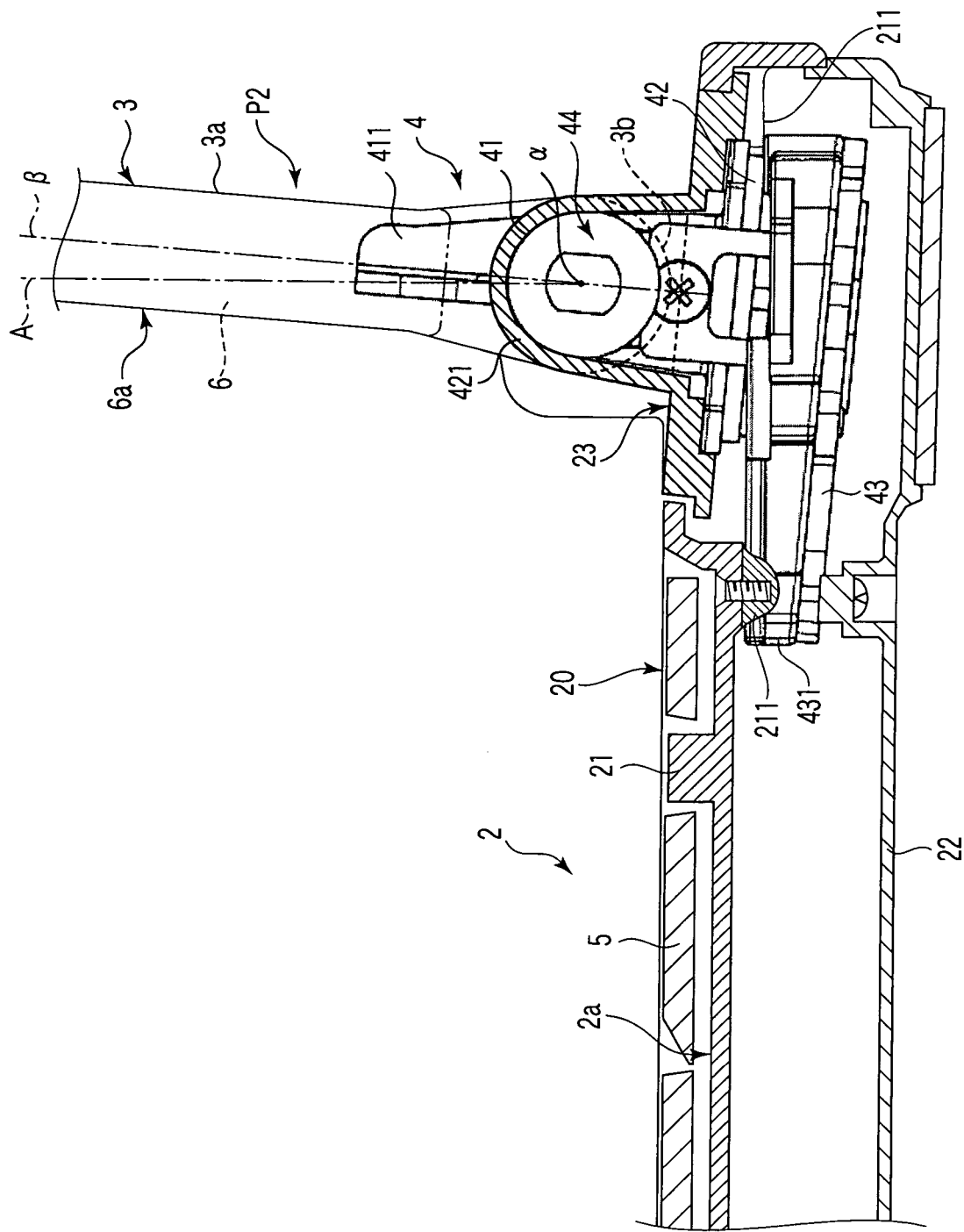
FIG. 5 is an exemplary cross section of the periphery of a hinge mechanism of the electronic apparatus shown in FIG. 1, viewed from the right-hand side.

As shown in FIG. 1 and FIG. 5, the swivel shaft 42 is provided to turn the display unit 3 together with the rotation shaft 41, around the axis β arranged in the direction orthogonal to the rotation shaft 41, in the state wherein the display unit 3 is rotationally moved from the closed state through the rotation shaft 41. The axis β of the swivel shaft is provided inclined to the top face 2a of the main body 2. Concretely, the axis β is inclined in the direction separating away from the keyboard 5, or rearward the main body 2 with respect to the normal A of the top face 2a of the main body 2.

The base plate 43 vertically supports the swivel shaft 42, as shown in FIG. 5. The main body housing 20 consists of an upper-side housing 21 and a lower-side housing 22. The upper-side housing 21 includes inside a fixing member 211 formed parallel to the top face 2a. The base plate 43 is fixed to the fixing member 211 and sandwiching a spacer 431.

As shown in FIG. 3, the spacer 431 is shaped like a horseshoe surrounding the swivel shaft 42 from the front side, and like a wedge increased in thickness from the front to the back side. The upper surface and lower surface of the spacer 431 forms the same angle as the rearward inclination of the axis β of the swivel shaft 42. Therefore, when the base plate 43 is mounted sandwiching the spacer 431, the normal of the upper surface of the base plate 43 coincides with the axis β. The spacer 431 may be previously fixed to the upper-side housing 21 with a screw, or may be fixed to the fixing member 211 of the upper-side housing 21 in the state being fit to the base plate 43.

The swivel shaft 42 is covered by a cover 421 shaped like a saddle as shown in FIG. 3. The top face 2a of the main body 2 has an inclined surface 23 inclined along a plane orthogonal to the swivel shaft 42, at the back side of the keyboard 5.

Next, an explanation will be given on the movement of the display unit 3 of the electronic apparatus 1 configured as above. The position of the display unit 3 taken to the keyboard 5 is defined in four states. The four states are sorted into two states, a laying state wherein the display unit 3 covers the keyboard 5, and a standing state wherein the display unit 3 stands up against the main body 2.

Figure 7:
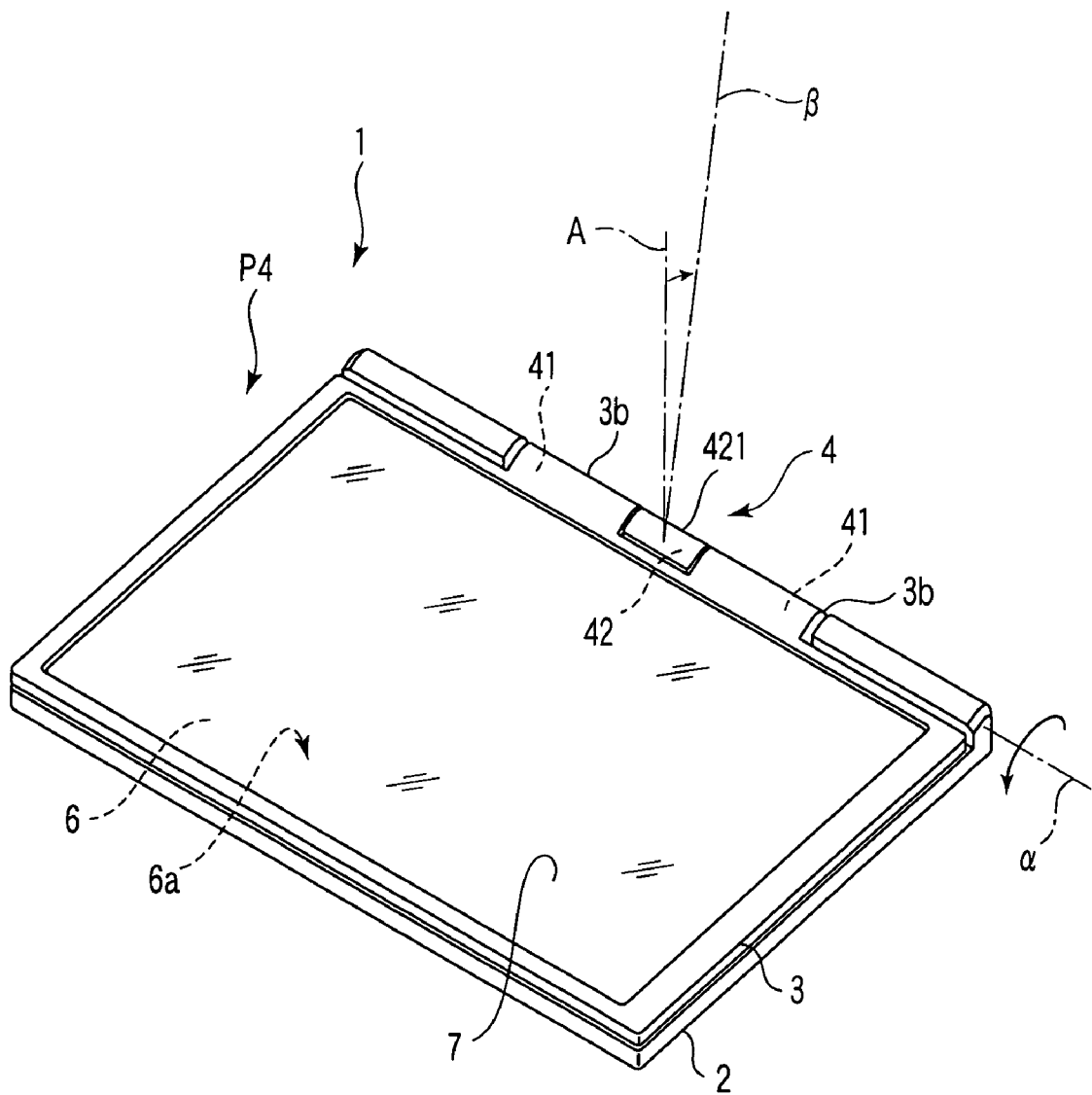
FIG. 7 is an exemplary perspective view of a display unit of the electronic apparatus shown in FIG. 1, overlaid with a display surface faced upward against the main body.

A first state is a closed state wherein the display unit 3 is laid over the main body 2 with the display surface 6a faced to the keyboard 5, and is sorted as a laying state. A second state is an opened state P2 wherein the display surface 6a is raised against the keyboard 5 as shown in FIG. 1, and is sorted as a standing state. A third state is a turned state wherein the rear side 3a of the display unit 3 is faced to the keyboard 5, and is sorted as a standing state. A fourth state is a reversed state wherein the display unit 3 is laid over the main body 2 with the display surface 6a faced upward and the rear side 3a faced to the keyboard 5, as shown in FIG. 7, and is sorted as a laying state.

In the operation of reversing the display unit 3, the display unit 3 is rotationally moved about the rotation shaft 41 of the hinge mechanism, from the closed state to the opened state P2, and then turned around the swivel shaft 42. After being transformed the turned state, the display unit 3 is further moved rotationally to a reversed state P4. Namely, the display unit 3 is substantially turned over 180° around the rotation shaft 41, and is further moved rotationally double the angle that the axis β is inclined to the normal A of the top face 2a of the main body 2. Moreover, the display unit 3 is rotated 180° around the swivel shaft 42 of the hinge mechanism 4, from the opened state P2 to the turned state.

The hinge mechanism 4 has a torque mechanism 44 at both ends of the rotation shaft 41. The torque mechanism 44 is a so-called a leading-in hinge, and has torque to urge the display unit 3 in the direction of pressing to the main body 2, in the closed state or reversed state P4 wherein the display unit 3 is laid over the main body 2. The torque mechanism 44 functions regardless when the display unit 3 is in the closed state or in the reversed state P4, and does not function when the display unit 3 is in the opened state P2 to the turned state. The swivel shaft 42 is hollow as shown in FIG. 2 and FIG. 3. The hollow inside space of the swivel shaft 42 is used to pass the signal cables of the liquid crystal display 6 and touch panel 7, the wiring connected to an antenna for wireless communication with peripheral equipment, the power cable of a backlight for the liquid crystal display 6, and so on.

When turning over the display unit 3 of the electronic apparatus 1 having the hinge mechanism 4, raise the display unit 3 from the closed state to the opened state P2, along the rotation shaft 41 against the urging force of the torque mechanism 44, as shown in FIG. 4. Turn the display unit 3 furthermore to the turned state around the swivel shaft 42. Pull down the display unit 3 from the turned state to the front to rotate around the rotation shaft 41 to the reversed state P4 shown in FIG. 7. Then the display unit 3 lay over the main body 2 with the display surface 6a faced upward. The display unit 3 is pressed to the main body 2 by the torque mechanism 44. Hence, the display unit 3 does not rattle in the reversed state P4.

Figure 6:
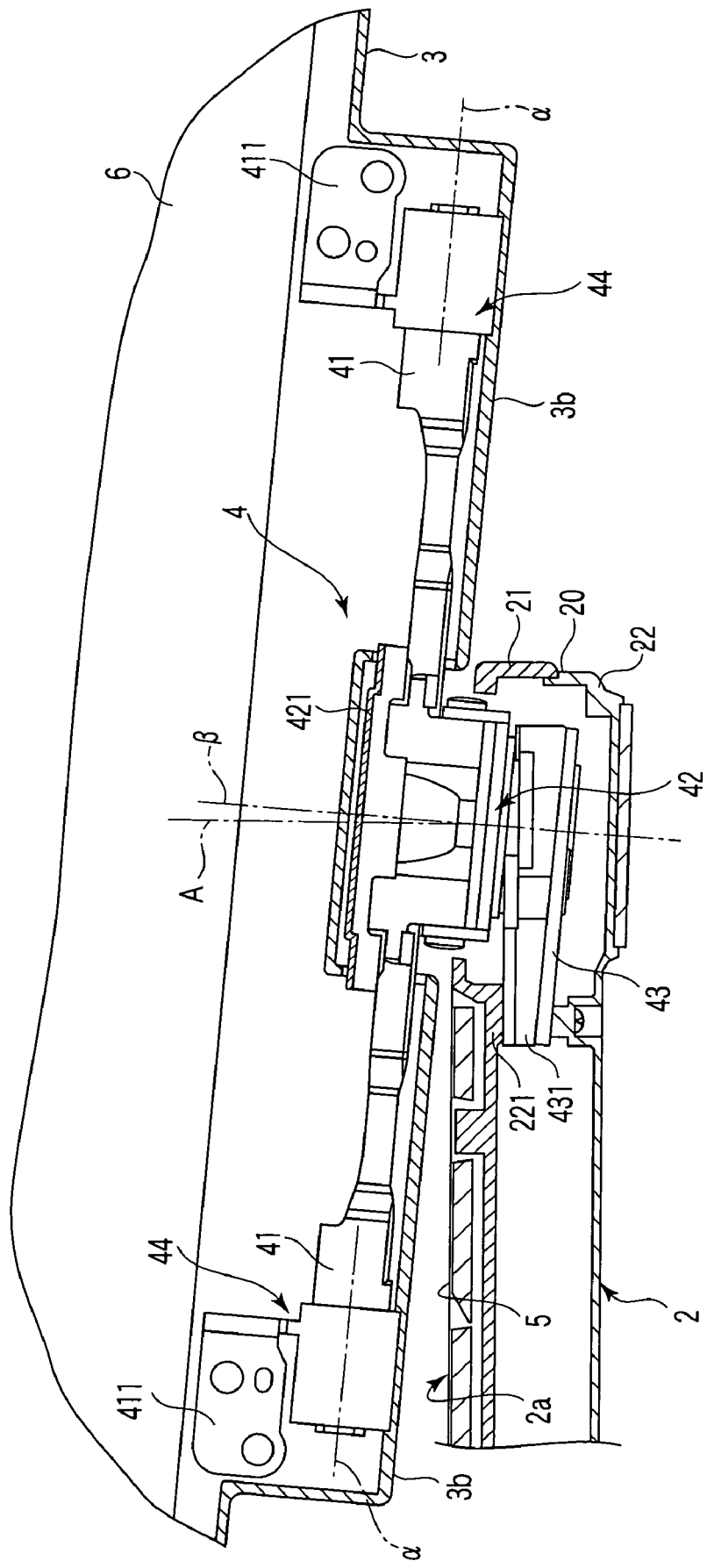
FIG. 6 is an exemplary cross section of the hinge mechanism of the electronic apparatus shown in FIG. 5, viewed from the right-hand side with a display unit turned 90 degrees around a swivel shaft.

The display unit 3 is turned around the axis β of the swivel shaft 42 inclined at the back side of the main body 2. Therefore, as shown in FIG. 6, the lower end 3b of the display unit 3 covering the rotation shaft 41 is floated from the keyboard 5 provided on the top face 2a of the main body 2, in the state wherein the display surface 6a of the display unit 3 is turned 90 degrees sideways for the user. As the lower end comes closer to the end of the display unit 3 far away from the swivel shaft 42, the lower end is floated further from the keyboard 5. Therefore, even if the main body housing 20 bends a little and the axis β of the swivel shaft 42 inclines to the keyboard 5 during reversing of the display unit 3, the display unit 3 does not touch the keyboard 5.

The inclination angle of the axis β of the swivel shaft 42 to the normal A of the top face 2a of the main body 2 is desirably at least 2 degrees, substantially 5-10 degrees close to the rear of the main body. In this embodiment, it is possible to set the angle of the axis β of the swivel shaft 42 by changing the spacer 431 to a desired one. Therefore, the same hinge mechanism 4 is applicable also to a different shape electronic apparatus, and the angle of the axis β of the swivel shaft 42 can be set for each apparatus. If the angle of inclining the axis β rearward is too large, the lower end 3b of the display unit 3 located rearward may touch a tabletop to place the main body 2, during the reversing operation. Thus, the axis β inclining angle should be determined to meet the size of the display unit 3.

The rotation shaft 41 has the torque mechanism 44. Therefore, in the electronic apparatus 1, the display unit 3 is firmly held without rattling in the closed state or reversed state P4, even if a latch mechanism is not provided.

Figure 8:
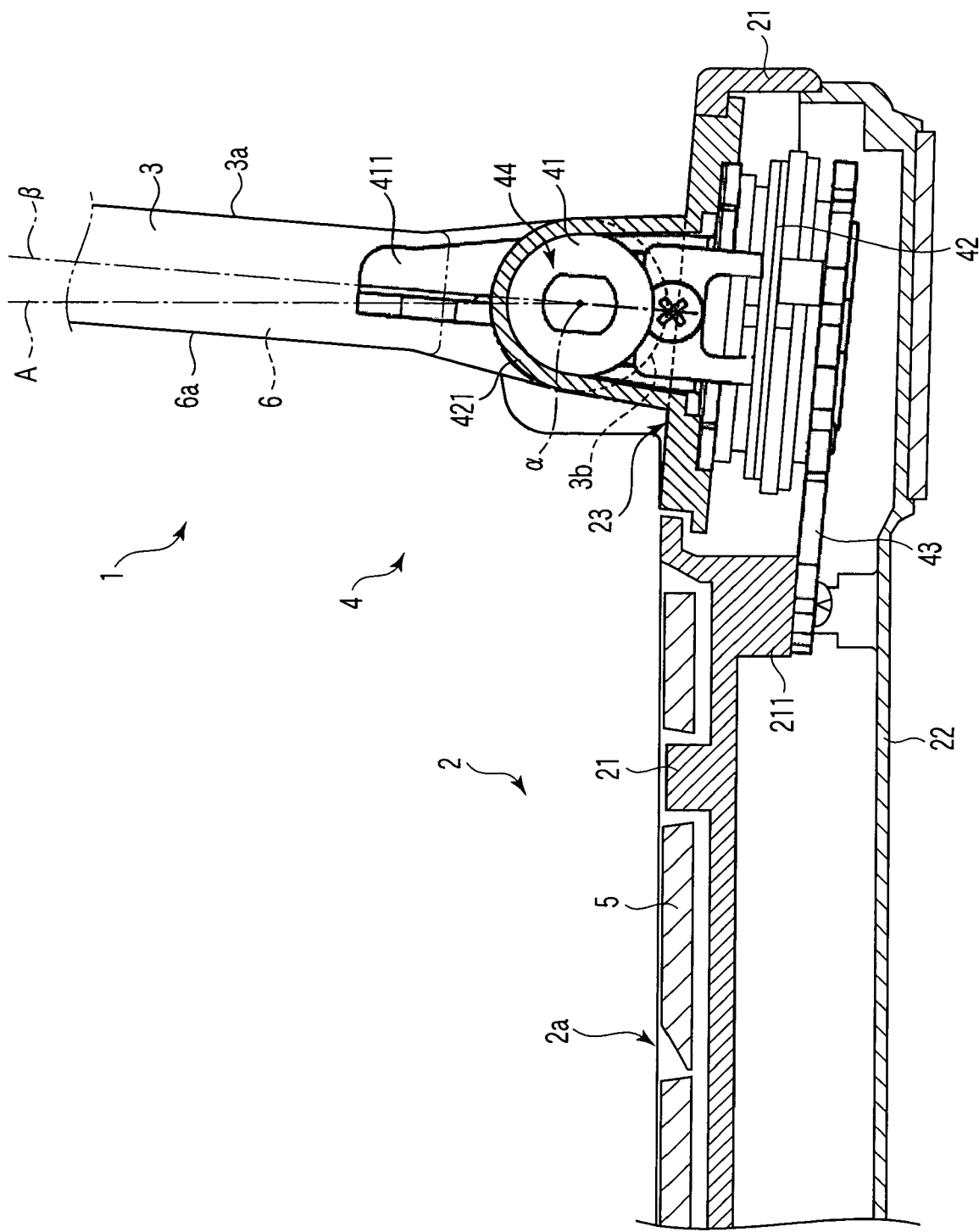
FIG. 8 is an exemplary cross section of the periphery of a hinge mechanism of an example of an electronic apparatus according to a second embodiment of the invention, viewed from the right-hand side.

Next, an explanation will be give on an electronic apparatus 1 according to a second embodiment of the invention with reference to FIG. 8. Comparing the electronic apparatus 1 of the first embodiment, the electronic apparatus 1 of the second embodiment is different in the structure of mounting the hinge mechanism 4 in the main body 2. The other configuration of the electronic apparatus in the second embodiment 1 is the same as the electronic apparatus in the first embodiment 1. Therefore, for the other configuration than the hinge mechanism 4, refer to the description of the first embodiment, and description will be omitted. The components having the same functions as those of the first embodiment electronic apparatus 1 are give the same reference numerals, and description will be omitted.

As shown in FIG. 8, a fixing member 211 provided in the main body 2 of the electronic apparatus 1 of this embodiment is formed along a plane where a normal coincides with a swivel shaft 42. A base plate 43 is directly fixed to the fixing member, and the swivel shaft 42 is inclined a little rearward the main body 2.

As the base plate 43 is directly fixed to the fixing member provided inside the main body 2, a rotation shaft 41 can be placed close to the main body 2. Therefore, the whole thickness of the electronic apparatus 1 can be reduced furthermore. This reduces the number of parts, and reduces the weight of the apparatus.

The invention is not limited to the foregoing embodiment but various changes and modifications of its components may be made without departing from the scope of the present invention. Also, the components disclosed in the embodiment may be assembled in any combination for embodying the present invention. For example, some of the components may be omitted from all the components disclosed in the embodiment. Further, components in different embodiments may be appropriately combined.

What is claimed is:

1. An electronic apparatus comprising:
   a main body which has a keyboard on the top face;
   a display unit which contains a display device; and
   a hinge mechanism which connects the display unit to the main body, said hinge mechanism having:
   a rotation shaft which makes the display unit rotatable between a closed state covering the keyboard and an opened state standing up against the main body; and
   a swivel shaft having an axis that is inclined rearwardly with respect to a normal to the top face of the main body, and makes the display unit turnable when the display unit is in a rotatable state;
   wherein the top face includes an inclined surface which is provided at the rear of the keyboard, and which is inclined along a plane orthogonal to the axis of the swivel shaft.

2. The electronic apparatus according to claim 1, wherein the axis of the swivel shaft extends across the inclined surface.

3. The electronic apparatus according to claim 1, wherein
   the hinge mechanism has a base plate to vertically support the swivel shaft; and
   the main body has a fixing member which is provided parallel to the top face, and supports the hinge mechanism
   the electronic apparatus further comprising a spacer which is fit between the fixing member and base plate, and inclines the base plate against the top face.

4. The electronic apparatus according to claim 1, wherein the hinge mechanism has a base plate to vertically support the swivel shaft; and
   the main body has a fixing member to hold the base plate.

5. The electronic apparatus according to claim 1, wherein the display unit contains an input means capable of inputting data.

6. The electronic apparatus according to claim 1, wherein the swivel shaft is made hollow along an axis, and used to pass cables and wiring from the main body to the display unit.

7. The electronic apparatus according to claim 1, wherein the rotation shaft has a torque mechanism to energize the display unit toward the main body, in proximity to an area where the display unit is laid over the main body.

8. The electronic apparatus according to claim 1, wherein the hinge mechanism has a base plate to vertically support the swivel shaft; and
   the main body has an upper-side housing and a lower-side housing, which are fixed through the base plate.

* * * * *